US008169444B2

(12) United States Patent
Tsai et al.

(10) Patent No.: US 8,169,444 B2

(45) Date of Patent: May 1, 2012

(54) BIT BLOCK TRANSFER CIRCUIT AND METHOD THEREOF AND COLOR FILLING METHOD

(75) Inventors: Chou-Liang Tsai, Tainan County (TW); Tzung-Ren Wang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1166 days.

(21) Appl. No.: 12/003,170

(22) Filed: Dec. 20, 2007

(65) Prior Publication Data

US 2009/0164713 A1 Jun. 25, 2009

(51) Int. Cl.
*G09G 5/37* (2006.01)
*G09G 5/36* (2006.01)
*G06F 13/00* (2006.01)

(52) U.S. Cl. ......................... 345/562; 345/537; 345/559

(58) Field of Classification Search ................. 345/530, 345/536, 537, 559, 562
See application file for complete search history.

(56) References Cited

U.S. PATENT DOCUMENTS 4,823,286 A * 4/1989 Lumelsky et al. ............ 345/611
5,077,678 A * 12/1991 Guttag et al. ................. 715/806
5,353,403 A * 10/1994 Kohiyama et al. ............ 345/563
5,812,143 A * 9/1998 Lum et al. ..................... 345/676

* cited by examiner

*Primary Examiner* — Joni Hsu

(74) *Attorney, Agent, or Firm* — Rabin & Berdo, P.C.

(57) ABSTRACT

A bit block transfer (Bitblt) circuit includes a read register, a write register, a bit shifting circuit and an overflowing register. The read register stores decomposition data including original data. The bit shifting circuit shifts the decomposition data in the read register to the write register and shifts bits of the decomposition data in the write register such that an initial bit of the original data of the decomposition data is situated apart from an initial address of the write register by a bit-shifting amount. The overflowing register coupled to the write register stores overflowing data of the original data overflowing from a memory length of the write register when the bits of the decomposition data in the write register are being shifted. The write register outputs and writes the decomposition data therein to a memory cell of a first memory.

13 Claims, 8 Drawing Sheets

BIT BLOCK TRANSFER CIRCUIT AND METHOD THEREOF AND COLOR FILLING METHOD

BACKGROUND OF THE INVENTION

1. Field of the Invention

The invention relates in general to a memory block transfer circuit, and more particularly to a bit alignment bit block transfer (Bitblt) circuit.

2. Description of the Related Art

In the modern times, the memory block transfer technology has existed. In an on screen display (OSD) device of a display, for example, the memory block transfer technology is applied to shift default graphic and menu information, stored in an off screen memory, to a frame buffer so that an OSD menu may be displayed on the display.

In the conventional memory block transfer technology, the minimum data quantity unit that may be operated is one byte. Thus, even if one bit of data in one byte is to be shifted, modified or accessed, the conventional memory block transfer technology has to perform the above-mentioned operation on the data of the whole byte. Consequently, the conventional memory block transfer technology occupies more memory transfer bandwidth.

In addition, in the occasion of applying the conventional memory block transfer technology to design a bit-based OSD module, one pixel is configured to correspond to at least 8 bits of OSD data such that the minimum image modifying and shifting unit of the bit-based OSD is one pixel because the minimum data quantity unit that can be operated is one byte in the conventional memory block transfer technology. Thus, the OSD module applying the conventional block transfer technology cannot be flexibly applied to the occasion such as the low-level OSD device, in which the pixel data quantity of one pixel is smaller than 8 bits, so that the conventional memory block transfer technology has the poor flexibility of application.

SUMMARY OF THE INVENTION

The invention is directed to a bit block transfer (Bitblt) circuit and a method thereof, in which one bit may serve as the minimum data quantity unit that may be operated. Compared with the conventional memory block transfer technology, the bit block transfer circuit and the method thereof according to the invention have the advantages of reducing the memory transfer bandwidth to be occupied, of enhancing a display effect of a display system and of being flexibly applied to an on screen display (OSD) module, in which the data quantity of each piece of pixel data is smaller than one byte.

According to a first aspect of the present invention, a bit block transfer circuit including a read register, a write register, a bit shifting circuit and an overflowing register is provided. The read register is for storing decomposition data including original data. The bit shifting circuit is for shifting the decomposition data in the read register to the write register and shifting bits of the decomposition data in the write register so that an initial bit of the original data of the decomposition data is situated apart from an initial address of the write register by a bit-shifting amount. The overflowing register is coupled to the write register and is for storing overflowing data of the original data overflowing from one bit of a memory space of the write register when the bits of the decomposition data in the write register are being shifted. The write register outputs and writes the decomposition data stored in the write register to a memory cell of a first memory.

According to a second aspect of the present invention, a bit block transfer method is provided. The method includes the steps of: storing decomposition data to a read register, the decomposition data including original data; responding with an original bit-shifting amount to shift bits of the decomposition data so that an initial bit of the original data is aligned with an initial address of the read register; storing the decomposition data to a write register; shifting the bits of the decomposition data in the write register so that the initial bit of the original data of the decomposition data is situated apart from an initial bit of the write register by a target bit-shifting amount; reading first target original data and storing the first target original data to the former target bit-shifting amount of addresses in the write register, wherein the first target original data is stored to the former target bit-shifting amount of bit addresses of a memory cell in a first memory; and storing the decomposition data in the write register to the memory cell.

According to a third aspect of the present invention, a color filling method is provided. The method includes the steps of: storing filling data to a read register; storing decomposition data to a write register; shifting bits of the filling data in the write register so that an initial bit of the filling data is situated apart from an initial bit of the write register by a target bit-shifting amount; reading first target original data and storing the first target original data to the former target bit-shifting amount of addresses in the write register, wherein the first target original data is data stored in the former target bit-shifting amount of bit addresses of a memory cell in a first memory; and storing the filling data in the write register to the memory cell.

The invention will become apparent from the following detailed description of the preferred but non-limiting embodiments. The following description is made with reference to the accompanying drawings.

DETAILED DESCRIPTION OF THE INVENTION

In the bit block transfer (Bitblt) circuit according to the embodiment of the invention, one bit may serve as the minimum data quantity unit that may be operated in a memory so that an operation such as position shifting or data filling may be performed.

The bit block transfer circuit according to the embodiment of the invention is applied to a display system, for example.

Figure 1:
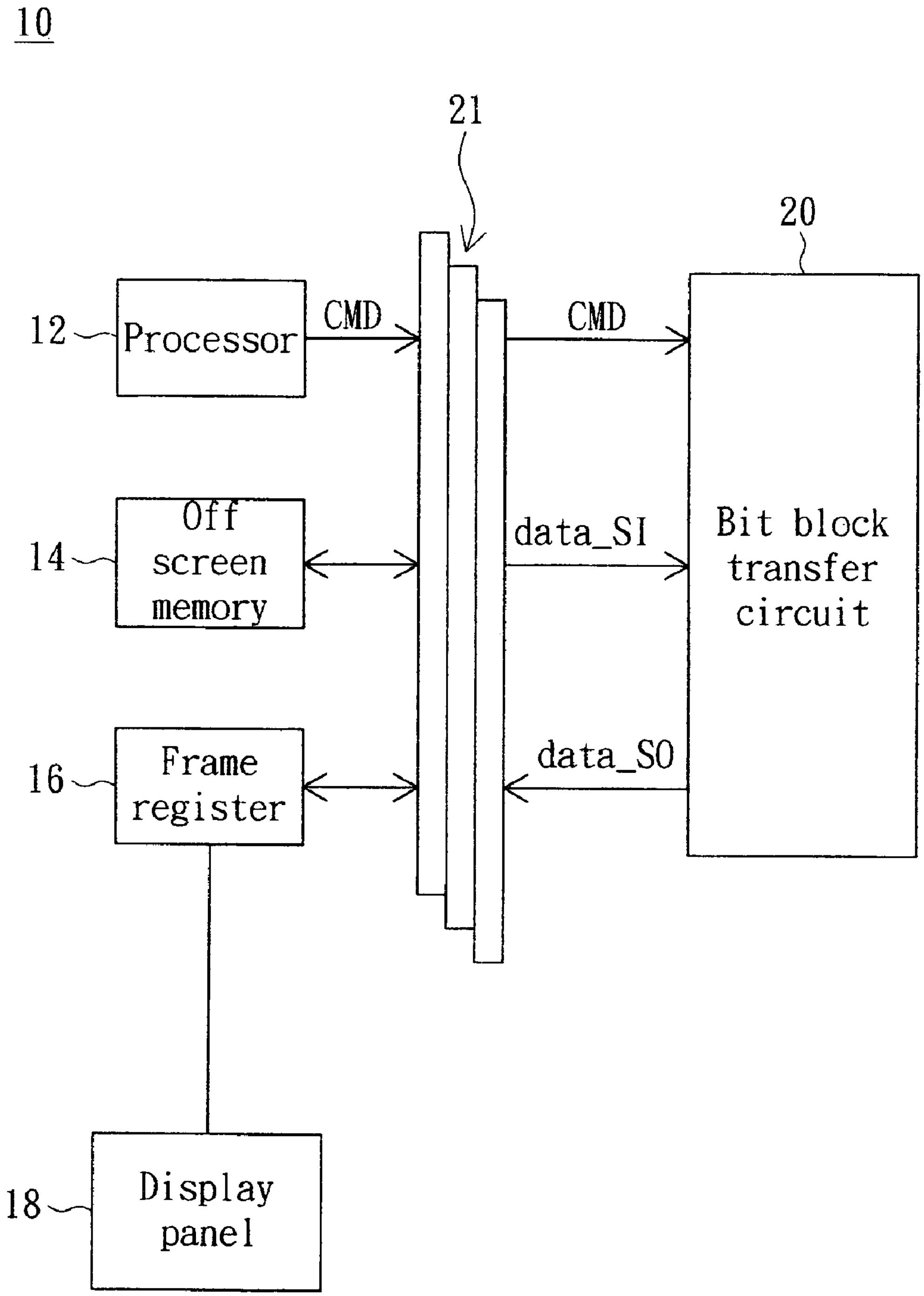
FIG. 1 is a block diagram showing a display system according to an embodiment of the invention.

FIG. 1 is a block diagram showing a display system 10 according to an embodiment of the invention. Referring to FIG. 1, the display system 10 includes a processor 12, an off screen memory 14, a frame register 16, a display panel 18 and a bit block transfer circuit 20. The display panel 18 is connected to the frame register 16. The processor 12, the off screen memory 14, the frame register 16 and the bit block transfer circuit 20 are connected together through a system bus 21.

The frame register 16 provides frame data to the display panel 18 to drive it to display a corresponding data frame. The frame register 16 includes, for example, 256 memory cells each including four bytes. The frame register 16 addresses a memory space therein through, for example, an address dst_ba. The address dst_ba satisfies, for example, the format: dst_ba={dst_cell,dst_lclp}, wherein dst_cell and dst_lclp respectively denote an address and a bit-shifting amount. The address dst_cell includes 8 bits and addresses the memory cell, and the address dst_cell is represented in a hexadecimal format. The bit-shifting amount dst_lclp includes 5 bits, for example, and records the bit-shifting amount of each bit data in the memory cell relative to an address of an initial bit of the memory cell. The bit-shifting amount dst_lclp is represented in a binary format. For example, the address dst_cell=0xA0 corresponds to the memory cell dst__0xA0, while the address dst_ba={0xA0,00000} to {0xA0,11111} corresponds to $1^{st}$ to $32^{th}$ bits of the memory cell dst__0xA0. Thus, the address dst_ba can address the each bit in the memory cell.

The off screen memory 14 is for storing predetermined data and includes 256 memory cells each including four bytes. The data in the off screen memory 14 is represented by the address scr_ba, which includes the address scr_cell and the bit-shifting amount scr_lclp. The address scr_cell and the bit-shifting amount scr_lclp respectively have substantially the same definitions as those of the address dst_cell and the bit-shifting amount dst_lclp so that the memory space of the off screen memory 14 can be addressed.

The processor 12 is for responding with an external trigger event to provide a control command CMD to drive the bit block transfer circuit 20 to execute the corresponding operation and thus to execute several data shifting or data setting operations. The bit block transfer circuit 20 receives the system input data data_SI, and responds with the command CMD to shift bits of the system input data data_SI, and then outputs the corresponding system output data data_SO. The system input data data_SI may be the off screen memory 14, the frame register 16 or any other circuit capable of providing data through the system bus 21, and the system output data data_SO may also be outputted to the off screen memory 14, the frame register 16 or any other circuit capable of receiving the data through the system bus 21. In the following, the operation of the bit block transfer circuit 20 of the invention will be described according to some embodiments.

First Embodiment

Figure 2:
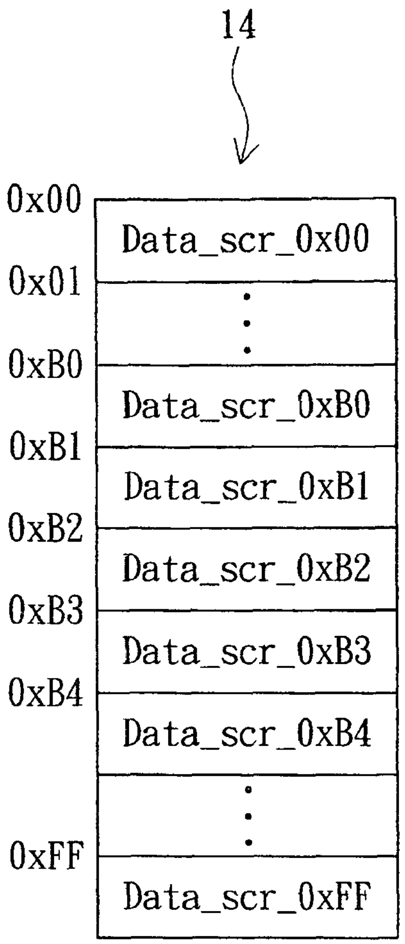
FIG. 2 is a schematic illustration showing a memory space of an off screen memory 14 of FIG. 1.

The bit block transfer circuit 20 and the method thereof according to this embodiment are for shifting the shift data SC in an original address of the off screen memory 14 to a target address of the frame register 16. FIG. 2 is a schematic illustration showing a memory space of the off screen memory 14 of FIG. 1. As shown in FIG. 2, the memory cells scr__0xB0 to scr__0xB4 respectively store the data data_scr__0xB0 to data_scr__0xB4, which are respectively equal to $(11111111)_{16}$, $(11111111)_{16}$, $(22222222)_{16}$, $(22222222)_{16}$ and $(A0B0C0D0)_{16}$. The data data_scr__0xB0 to data_scr__0xB4 serve as, for example, the system input data data_SI to be inputted to the bit block transfer circuit 20.

For example, the shift data SC includes 128 bits and the original address includes the address scr_ba={0xB0,00001} to {0xB4,00000}. That is, in the initial condition, the shift data SC is stored in the memory cells scr__0xB0 to scr__0xB4, and the initial bit of the shift data SC is situated apart from the initial address of the memory cell scr__0xB0 by an original bit-shifting amount scr_lclp=$(00001)_2$. More specifically, the shift data SC includes $2^{nd}$ to $32^{nd}$ bits in the data data_scr__0xB0, all the data in the data data_scr__0xB1 to data_scr__0xB3, and the first bit in the data data_scr__0xB4, and the value thereof is equal to $(11111111111111110888888888888888)_{16}$.

Figure 3:
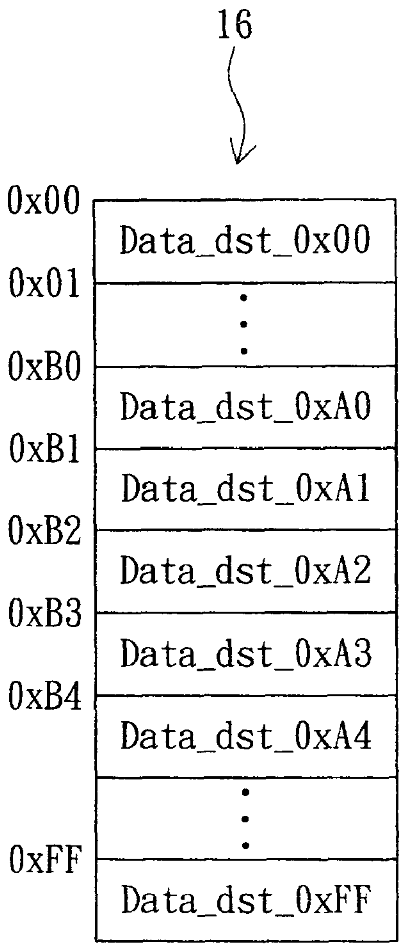
FIG. 3 is a schematic illustration showing a memory space of a frame register 16 of FIG. 1.

FIG. 3 is a schematic illustration showing a memory space of the frame register 16 of FIG. 1. Referring to FIG. 3, for example, the target address includes the address dst_ba={0xA0,00100} to {0xA4,00011}. In other words, after the shift data SC is shifted to the target address, the initial bit of the shift data SC has a target bit-shifting amount dst_lclp, which has the value equal to $(00100)_2$, for example, relative to the initial address of the memory cell dst__0xA0. For example, the memory cells dst__0xA0 to dst__0xA4 are respectively stored to the data data_dst__0xA0 to data_dst__0xA4, which are equal to $(10101010)_{16}$, $(0A0B0C0D)_{16}$, $(A0B0C0D0)_{16}$, $(0A0B0C0D)_{16}$ and $(0F0F0F0F)_{16}$, in an initial state. After the shift data SC is shifted to the target address, some data in the data data_dst__0xA0 and data_dst__0xA4 is covered by the shift data SC, and some data is kept. The kept data in the data data_dst__0xA0 and data_dst__0xA4 includes the target original data ST_P and ST_A. The target original data ST_P includes the data, which is stored at the address dst_ba={0xA0,00000} to {0xA0,00011} and has the value equal to, for example, $(0000)_2$. The target original data ST_A includes the data, which is stored at the address dst_ba={0xA4,00100} to {0xA4,11111} and has the value equal to $(0000111100001111000011110000)_2$, for example.

Figure 4:
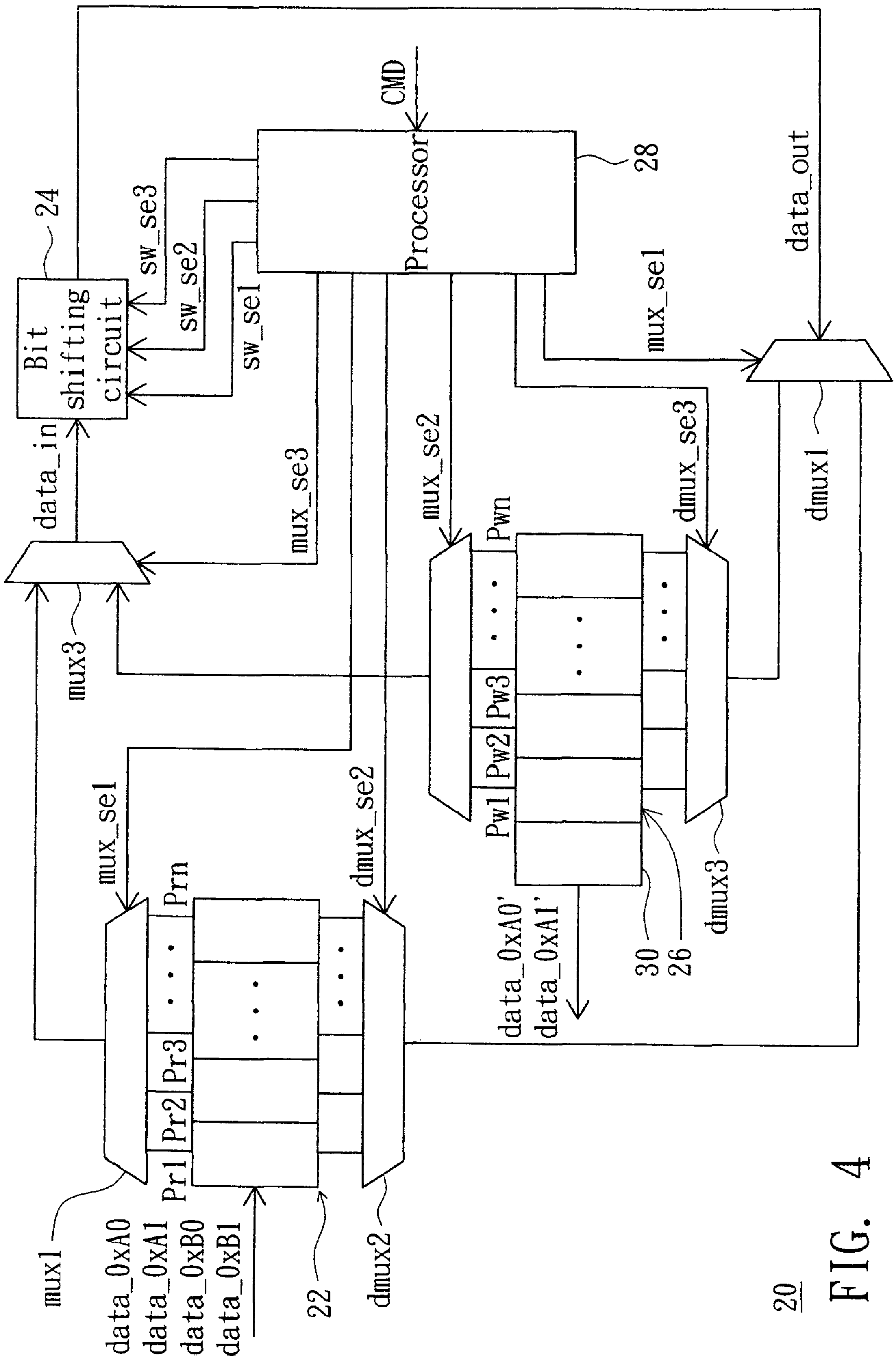
FIG. 4 is a circuit diagram showing a bit block transfer circuit according to a first embodiment of the invention.

FIG. 4 is a circuit diagram showing the bit block transfer circuit 20 according to a first embodiment of the invention. Referring to FIG. 4, the bit block transfer circuit 20 includes a read register 22, a bit shifting circuit 24, a write register 26, a processor 28, an overflowing register 30, multiplexers mux1 to mux3 and de-multiplexers dmux1 to dmux3. The read register 22 includes memory cells Pr1 to Prn for storing the system input data data_SI, wherein n is a natural number. The memory space of the memory cells Pr1 to Prn is 32 bits, for example, wherein n is equal to 2, for example. Consequently, the memory space of the read register 22 is equal to 64 (=2×32) bits, and is smaller than the total data amount of the system input data data_SI. The read register 22 sequentially stores the system input data data_SI to its memory space. Each time when the memory space of the read register 22 is full of data, the data stored therein is divided into several data divisions. For example, the system input data data_SI is divided into head data data_H, body data data_B and tail data data_T, which respectively include data data_scr__0xB0 and data_scr__0xB1, data data_scr__0xB2 and data_scr__0xB3 and data data_scr__0xB4. The bit block transfer circuit 20 shifts the data of these divisions.

The read register 22 sequentially stores the head, body and tail data data_H, data_B and data_T so that the bit block transfer circuit 20 can sequentially shift the bits of the system input data data_SI. The read register 22 sequentially arranges, from the low power to the high power, the former 32 bits and the later 32 bits of the head, body and tail data data_H, data_B and data_T in 32 bits of the memory space of the memory cells Pr1 and Pr2 from bottom to top. For example, when the head data data_H is being stored, the former 32 bits and the later 32 bits $(00010001000100010001000100010001)_2$ and $(00010001000100010001000100010001)_2$ of the head data data_H are sequentially stored in 32 bits of the memory space of the memory cells Pr1 and Pr2 from bottom to top.

The write register 26 includes memory cells Pw1 to Pwm, wherein m is a natural number. The length of each of the memory cells Pw1 to Pwm is equal to 32 bits, for example, wherein m is equal to 2, for example. The write register 26 outputs the obtained system output data data_SO. The length of the overflowing register 30 is equal to 32 bits, and the overflowing register 30 is the third memory cell of the write register 26, and is for storing the data of the memory cell Pw2 overflowing from the memory space of the memory cell Pw2 due to the shifting operation.

The multiplexer mux1 responds with a select signal mux_se1 to output stored data in one of the memory cells Pr1 and Pr2. The multiplexer mux2 responds with a select signal mux_se2 to output stored data in one of the memory cells Pw1 and Pw2 and the overflowing register 30. The multiplexer mux3 receives the data outputted from the multiplexers mux1 and mux2, and responds with a select signal mux_se3 to adopt the data outputted from one of the multiplexers mux1 and mux2 as input data data_in to be outputted.

The de-multiplexer dmux1 responds with a select signal dmux_se1 to provide output data data_out to one of the de-multiplexers dmux2 and dmux3. The de-multiplexer dmux2 responds with a select signal dmux_se2 to provide the output data data_out to one of the memory cells Pr1 and Pr2 in order to store the output data data_out to one of the memory cells Pr1 and Pr2. The de-multiplexer dmux3 responds with a select signal dmux_se3 to provide the output data data_out to one of the memory cells Pw1 and Pw2 and the overflowing register 30 in order to store the output data data_out to one of the memory cells Pw1 and Pw2 and the overflowing register 30.

Figure 5:
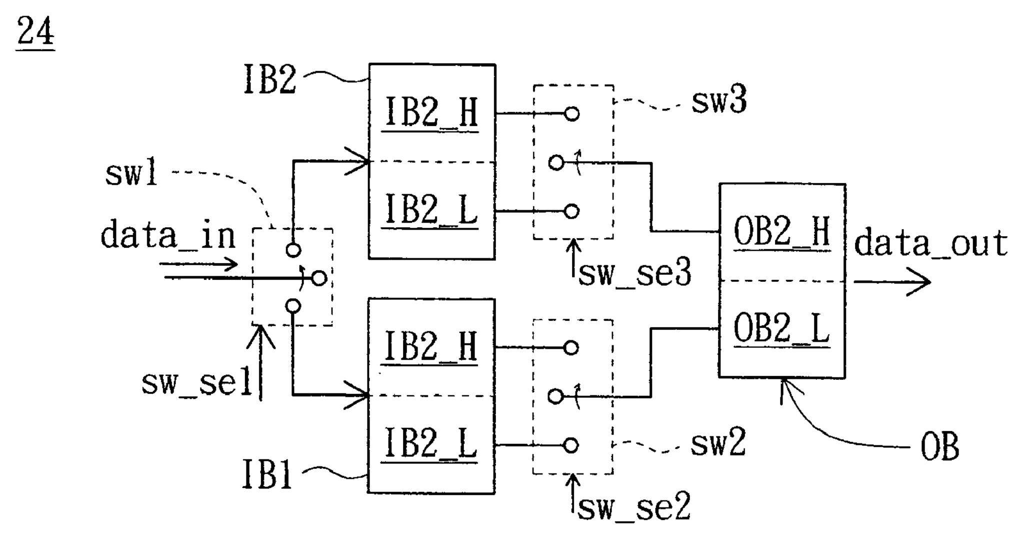
FIG. 5 is a block diagram showing a bit shifting circuit 24 of FIG. 4.

FIG. 5 is a block diagram showing the bit shifting circuit 24 of FIG. 4. Referring to FIG. 5, the bit shifting circuit 24 includes input registers IB1 and IB2, an output register OB and switch units SW1 to SW3. The switch unit SW1 receives the input data data_in and responds with a select signal SW_se1 to provide the input data data_in to one of the input registers IB1 and IB2. The input registers IB1 and IB2 controlled by the processor 28 are respectively divided into an upper half portion IB1_H and a lower half portion IB1_L and an upper half portion IB2_H and a lower half portion IB2_L. The processor 28 determines lengths of the upper half portion IB1_H and the lower half portion IB1_L of the input register IB1, and determines lengths of the upper half portion IB2_H and the lower half portion IB2_L of the input register IB2. The input registers IB1 and IB2 are implemented by a flip-flop circuit, for example.

The switch unit SW2 is for responding with a select signal SW_se2 to select and output the data in one of the upper half portion IB1_H and the lower half portion IB1_L to the output register OB. The switch unit SW3 is for responding with a select signal SW_se3 to select and output the data in one of the upper half portion IB2_H and the lower half portion IB2_L to the output register OB. The output register OB receives and merges the data provided by the switch units SW2 and SW3 to obtain the output data data_out. The total length of the input registers IB1 and IB2 and the output register OB is equal to that of the memory cells Pr1 and Pr2 of the read register 22. That is, the total length of the input registers IB1 and IB2 and the output register OB is equal to 32 bits.

Figure 6:
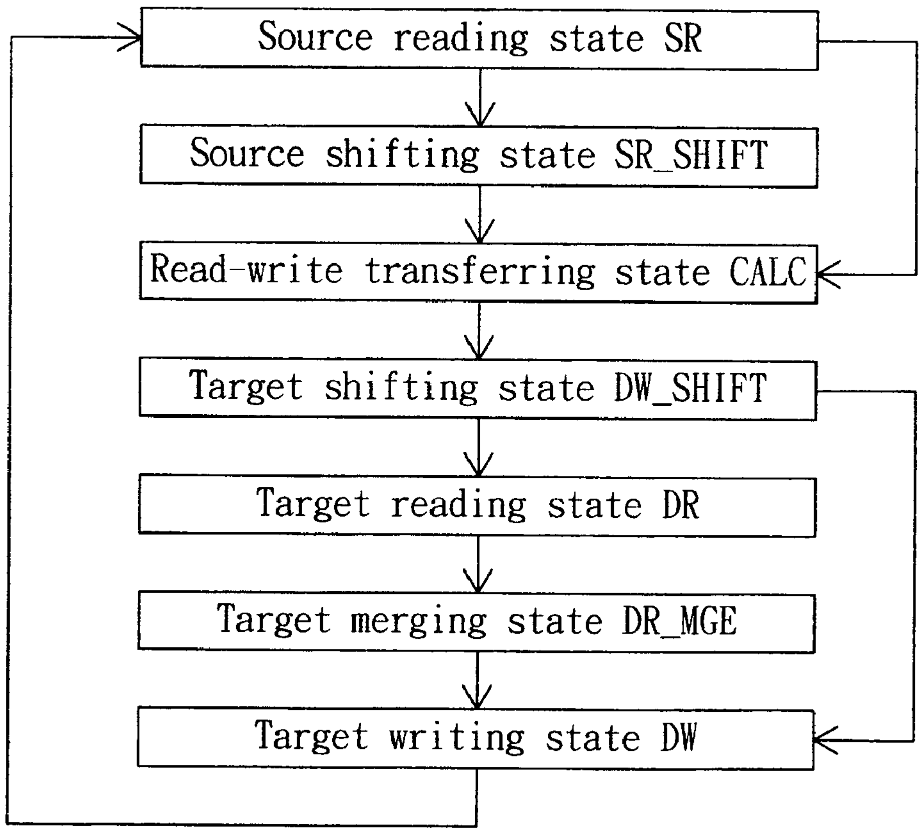
FIG. 6 is a block diagram showing a state machine executed by a processor 28 of FIG. 4.

The processor 28 is further programmed to execute a state machine, as shown in FIG. 6, to control the bit block transfer circuit 20 to operate. The processor 28 includes a source reading state SR, a source shifting state SR_SHIFT, a read-write transferring state CALC, a target shifting state DW_SHIFT, a target reading state DR, a target merging state DR_MGE and a target writing state DW. The processor 28 generates, according to the states and a control signal CMD, the select signals mux_se1 to mux_se3, dmux_se1 to dmux_se3 and SW_se1 to SW_se3 to control the multiplexers mux1 to mux3, the de-multiplexers dmux_1 to dmux_3 and the switches SW1 to SW3 to operate. The processor 28 further controls the bit shifting circuit 24 to operate according to the states thereof. Next, the operation of the bit block transfer circuit 20 when the processor 28 in each state will be described in the following examples, in which the head data data_H, the body data data_B, and the tail data data_T are respectively operated by the bit block transfer circuit 20.

The processor 28 first shifts the head data data_H to the corresponding target address of the frame register 16. When the head data data_H is being shifted, the processor 28 sequentially enters the source reading state SR, the source shifting state SR_SHIFT, the read-write transferring state CALC, the target shifting state DW_SHIFT, the target reading state DR, the target merging state DR_MGE and the target writing state DW. First, the processor 28 enters the source reading state SR. At this time, the read register 22 reads the head data data_H and respectively stores the data data_scr__0xB0 and data_scr__0xB1 thereof to the memory cells Pr1 and Pr2.

Next, the processor 28 enters the source shifting state SR_SHIFT. At this time, the bit shifting circuit 24 is driven to respond with an original bit-shifting amount scr_lclp to shift the stored positions of the data stored in the memory cells Pr1 and Pr2 of the read register 22. When the data in the memory cell Pr1 is being shifted, the processor 28 provides the corresponding select signals mux_se1, mux_se3, and SW_se1 to control the multiplexers mux1 and mux3, and the switch unit SW1 to respectively provide the data in the memory cells Pr1 and Pr2 to the input registers IB1 and IB2.

At this time, the registers IB1 and IB2 are respectively divided into the upper half portion IB1_H and the lower half portion IB1_L, and the upper half portion IB2_H and the lower half portion IB2_L. The length of the upper half portion IB1_H is equal to the scr_lclp_bar bits to store the later cr_lclp_bar bits in the memory cell Pr1. The parameter scr_lclp_bar is equal to the difference between the total bit number of the memory cells of the off screen memory 14 and the original bit-shifting amount scr_lclp. That is, the parameter scr_lclp_bar is equal to 31(=32−1), and the upper half portion IB1_H includes the data $(0001000100010001000100010001000)_2$. The length of the lower half portion IB1_L is equal to the scr_lclp bits to store the former scr_lclp bits in the memory cell (i.e., the first bit $(1)_2$ in the memory cell Pr1). Because the data data_scr__0xB0 and data_scr__0xB1 have substantially the same data, the upper half portion IB2_H and the lower half portion IB2_L respectively have the data contents substantially the same as those of the upper half portion IB1_H and the lower half portion IB1_L.

The output register OB is divided into an upper half portion OB_H and a lower half portion OB_L. The lengths of the upper half portion OB_H and the lower half portion OB_L are respectively equal to scr_lclp and scr_lclp_bar bits. The switch units SW2 and SW3 respond with the select signals SW_se2 and SW_se3 to select the data of the lower half portion IB2_L and the upper half portion IB1_H, and to store the data thereof to the upper half portion OB_H and the lower half portion OB_L, respectively. Next, the output register OB merges the data of the upper half portion OB_H and the lower half portion OB_L to get the data $(88888888)_{16}$, which is outputted as the output data data_out. The data $(88888888)_{16}$ is substantially equal to the former 32 bits of the shift data SC. The de-multiplexers dmux1 and dmux2 respectively respond with the select signals dmux_se1 and dmux_se2 to output the output data data_out to the memory cell Pr1 so as to shift the data in the memory cell Pr1.

When the data in the memory cell Pr2 is being shifted, the bit block transfer circuit 20 executes the operation data substantially the same as that of shifting the data in the memory cell Pr1 so that the memory cell Pr2 stores the data $(08888888)_{16}$, which is the $33^{rd}$ to $64^{th}$ bits in the shift data SC.

Then, the processor 28 enters the read-write transferring state CALC to shift the data in the read register 22 to the write register 26. In the read-write transferring state CALC, the read register 22, the bit shifting circuit 24 and the multiplexers mux1 and mux3 are controlled to execute the steps substantially the same as those of shifting the data in the read register 22 so that the same output data data_out is generated. The de-multiplexers dmux1 and dmux3 respectively respond with the select signals dmux_se1 and dmux_se3 to provide the output data data_out to the memory cells Pw1 and Pw2. Therefore, the data in the memory cells Pr1 and Pr2 can be respectively shifted to the memory cells Pw1 and Pw2. At this time, the memory cells Pw1 and Pw2 respectively store the data $(88888888)_{16}$ and $(08888888)_{16}$.

Next, the processor 28 enters the target shifting state DW_SHIFT. At this time, the bit shifting circuit 24 is driven and thus responds with the target bit-shifting amount dst_lclp to shift the stored positions of the data in the memory cells Pw1 and Pw2. When the data in the memory cell Pw1 is being shifted, the processor 28 provides the corresponding select signals mux_se2, mux_se3 and SW_se1 to respectively control the multiplexers mux2 and mux3 and the switch unit SW1 to provide the data in the memory cell Pw1 to the input register IB2. The data in the input register IB1 is the initial value, such as $(00000000)_{16}$. The switch units SW2 and SW3 respectively select the former dst_lclp bits $(0000)_2$ in the memory cell IB1 and the former dst_lclp_bar bits $(1000100010001000100010001000)_2$ in the memory cell IB2, and stores the bits to the upper half portion OB_H and the lower half portion OB_L. Thus, the data $(88888880)_{16}$ is obtained and outputted as the output data data_out. The de-multiplexers dmux1 and dmux3 respectively respond with the select signals dmux_se1 and dmux_se3 to output the output data data_out to the memory cell Pw1 so as to shift the data in the memory cell Pw1.

When the data in the memory cell Pw2 is being shifted, the processor 28 provides the corresponding select signals mux_se2, mux_se3 and SW_se1 to control the multiplexers mux2 and mux3 and the switch unit SW1 to respectively provide the data in the memory cells Pw1 and Pw2 to the input registers IB1 and IB2. The bit shifting circuit 24 selects the later dst_lclp bits $(1000)_2$ of the input register IB1 and the former dst_lclp_bar bits $(1000100010001000100010001000)_2$ of the input register IB2, and stores the bits to the upper half portion OB_H and the lower half portion OB_L, respectively. Thus, the data $(88888888)_{16}$ is obtained and outputted as the output data data_out, and the output data data_out is outputted to the memory cell Pw2 so that the data in the memory cell Pw2 can be shifted.

At this time, the last $4^{th}$ to the last $2^{nd}$ bits (i.e., $(000)_2$) in the original memory cell Pw2 are stored in the overflowing register 30 due to the overflowing data data_Le generated when the data in the read and write registers 22 and 26 are shifted. More specifically, when the data in the memory cell Pw2 is being shifted, the later dst_lclp bits (i.e., the overflowing data $(000)_2$) in the input register IB2 are shifted to the space of the former three bits of the overflowing register 30. Thereafter, when the read register 22 reads the body data data_B and the bit block transfer circuit 20 correspondingly shifts the data in the body data data_B, the overflowing data data_Le is shifted to the corresponding memory position in the write register 26.

Then, the processor 28 enters the target reading state DR. At this time, the read register 22 is driven to read the data data_dst__0xA1 and stores the data data_dst__0xA1 to the memory cell Pr1. The data data_dst__0xA1 has the target original data ST_P.

Next, the processor 28 enters the target merging state DR_MGE. At this time, the bit shifting circuit 24 is driven to merge the target original data ST_P in the memory cell Pr1 into the memory cell Pw1. When the target original data ST_P is being merged into the memory cell Pw1, the processor 28 provides the corresponding control signals mux_se2, mux_se3 and SW_se1 to respectively control the multiplexers mux2 and mux3 and the switch unit SW1 to provide the data in the memory cell Pw1 to the input register IB2. The processor 28 also provides the control signals mux_se1, mux_se3 and SW_se1 to respectively control the multiplexers mux1 and mux3 and the switch unit SW1 to provide the data in the memory cell Pr1 to the input register IB1. The bit shifting circuit 24 selects the former dst_lclp bits $(0000)_2$ of the input register IB1 and the later dst_lclp_bar bits $(10001000100010001000100010000000)_2$ of the input register IB2, and stores the bits to the upper half portion OB_H and the lower half portion OB_L, respectively. Thus, the merged data $(88888880)_{16}$ can be obtained and outputted as the output data data_out, and the output data data_out is outputted to the memory cell Pw1 so that the target original data ST_P is merged into the former four bits of the memory space of the memory cell Pw1.

Thereafter, the processor 28 enters the target writing state DW. At this time, the write register 26 outputs the data in the memory cells Pw1 and Pw2 as the system output data data_SO to be outputted, and the data in the memory cells Pw1 and Pw2 are respectively written into the memory cells dst__0xA0 and dst__0xA1. Thus, the operation of shifting a portion of the shift data SC, contained in the head data data_H, to the target address of the frame register 16 is finished.

After the operation of shifting the head data data_H is finished, the processor 28 shifts the body data data_B to the corresponding target address in the frame register 16. The difference between the operations of shifting the body data data_B and the head data data_H is that the processor 28 sequentially executes the source reading state SR, the read-write transferring state CALC, the target shifting state DW_SHIFT, the target reading state DR and the target writing state DW. The processor 28 first enters the source reading state SR. At this time, the read register 22 reads the body data data_B, and respectively stores the data data_scr__0xB2 and data_scr__0xB3 to the memory cells Pr1 and Pr2.

Next, the processor 28 enters the read-write transferring state CALC. At this time, the bit block transfer circuit 20 executes the operation, which is substantially the same as that of shifting the head data data_H when the processor 28 enters the read-write transferring state CALC so that the data in the memory cells Pr1 and Pr2 are respectively transferred to the registers Pw1 and Pw2.

Then, the processor 28 enters the target shifting state DW_SHIFT. At this time, the bit shifting circuit 24 is driven and thus responds with a synthetic bit-shifting amount dw_rest to shift the stored positions of the data in the memory cells Pw1 and Pw2, and to shift the overflowing data data_Le stored in the overflowing register 30 to the former dw_rest bits of the write register 26. The synthetic bit-shifting amount dw_rest is equal to the difference between the original bit-shifting amount scr_lclp and the target bit-shifting amount dst_lclp. That is, $$dw\_rest = dst\_lclp - scr\_\_lclp.$$

In this embodiment, the synthetic bit-shifting amount dw_rest is equal to 3.

When the data in the memory cell Pw1 is being shifted, the processor 28 provides the corresponding select signals mux_se2, mux_se3 and SW_se1 to respectively control the multiplexers mux2 and mux3 and the switch unit SW1 to provide the data in the memory cell Pw1 to the input register IB2, and to provide the overflowing data data_Le in the overflowing register 30 to the input register IB1. The overflowing data data_Le is stored in the former dw_rest bits of the input register IB1. The bit shifting circuit 24 selects the former dw_rest bits $(000)_2$ of the input register IB1 and the former dw_rest_bar bits of the input register IB2, and respectively stores the bits to the upper half portion OB_H and the lower half portion OB_L. The parameter dw_rest_bar is equal to the difference between the total bit number in the memory cell Pw1 and the synthetic bit-shifting amount dw_rest. That is, the parameter scr_lclp_bar is equal to 29(~32−3), and the upper half portion OB_H includes the data $(00010001000100010001000100010)_2$. Thus, the merged data $(11111110)_{16}$ is obtained and outputted as the output data data_out, and the output data data_out is outputted to the memory cell Pw1. Consequently, the data in the memory cell Pw1 can be shifted, and the overflowing data data_Le can be stored in the former dw_rest bits of the overflowing register 30.

When the data in the memory cell Pw2 is being shifted, the processor 28 provides the corresponding select signals mux_se2, mux_se3 and SW_se1 to control the multiplexers mux2 and mux3 and the switch unit SW1 to respectively provide the data in the overflowing register 30 and Pw2 to the input registers IB1 and IB2. Next, the bit shifting circuit 24 selects the former dw_rest bits $(001)_2$ of the input register IB1 and the former dw_rest_bar bits $(00010001000100010001000100010)_2$ of the input register IB2, and respectively stores the bits to the upper half portion OB_H and the lower half portion OB_L. Thus, the merged data $(11111111)_{16}$ is obtained and outputted as the output data data_out, and the output data data_out is outputted to the memory cell Pw2 so that the operation of shifting the data in the memory cell Pw2 can be finished. At this time, the later 3 bits (i.e., $(001)_2$) of the original memory cell Pw2 are stored in the overflowing register 30 due to the overflowing data data_Le generated when the data in the read and write registers 22 and 26 are shifted.

Thereafter, the processor 28 enters the target writing state DW. At this time, the write register 26 outputs the data in the memory cells Pw1 and Pw2 as the system output data data_SO, and the data in the memory cells Pw1 and Pw2 are respectively written into the memory cells dst__0xA2 and dst__0xA3. Thus, the operation of shifting the portion of the shift data SC, contained in the body data data_B, to the target address of the frame register 16 can be finished.

After the operation of shifting the body data data_B is finished, the processor 28 shifts the tail data data_T to the corresponding target address in the frame register 16. During the operation of shifting the tail data data_T, the bit block transfer circuit 20 sequentially enters the source reading state SR, the read-write transferring state CALC, the target shifting state DW_SHIFT, the target reading state DR, the target merging state DR_MGE and the target writing state DW to read and store the data data_scr__0xB4 to the memory cell Pr1, to shift the data in the memory cell Pr1 to the memory cell Pw1, to respond with the synthetic bit-shifting amount dw_rest to merge the overflowing data data_Le (i.e., the data $(001)_2$) into the former dw_rest bits of the data in the memory cell Pw1, to read and store the data data_dst__0xA4 to the memory cell Pr1, to store the later dw_restx_bar bits of the memory cell Pr1 to the later dw_restx_bar bits of the memory cell Pw1, and to output the data in the memory cell Pw1 as the system output data data_SO. The data in the memory cell Pw1 is written into the memory cell dst__0xA4.

The parameter dw_restx_bar is equal to the difference between the bit number of the memory cell Pw1 and the parameter dw_restx. The parameter dw_restx is equal to the sum of the parameter dst_lclp and the parameter width_rclp. The parameter width_rclp is substantially equal to the parameter, which is obtained after a modulo operation is performed on the shift data SC with respect to the bits of the memory space of the read register 22. The parameters width_rclp, dw_restx and dw_restx_bar satisfy the following equations:

$$\begin{cases} width\_rclp = BN\_SC \bmod BN\_RB = 128 \bmod 64 = 0 \\ dw\_restx = dst\_1clp + width\_rclp = 4 + 0 = 0 \\ dw\_restx\_bar = BN\_Pw1 - dw\_restx = 32 - 4 = 28 \end{cases}$$

According to the above-mentioned equation, it is obtained that the parameters width_rclp, dw_restx and dw_restx_bar are respectively equal to 0, 4 and 28.

For example, the processor 28 judges whether the received data pertains to the head, body and tail data data_H, data_B and data_T or not, and executes different steps of state machines to perform the corresponding operations on different pieces of data when the different pieces of data are received.

Figure 7A:
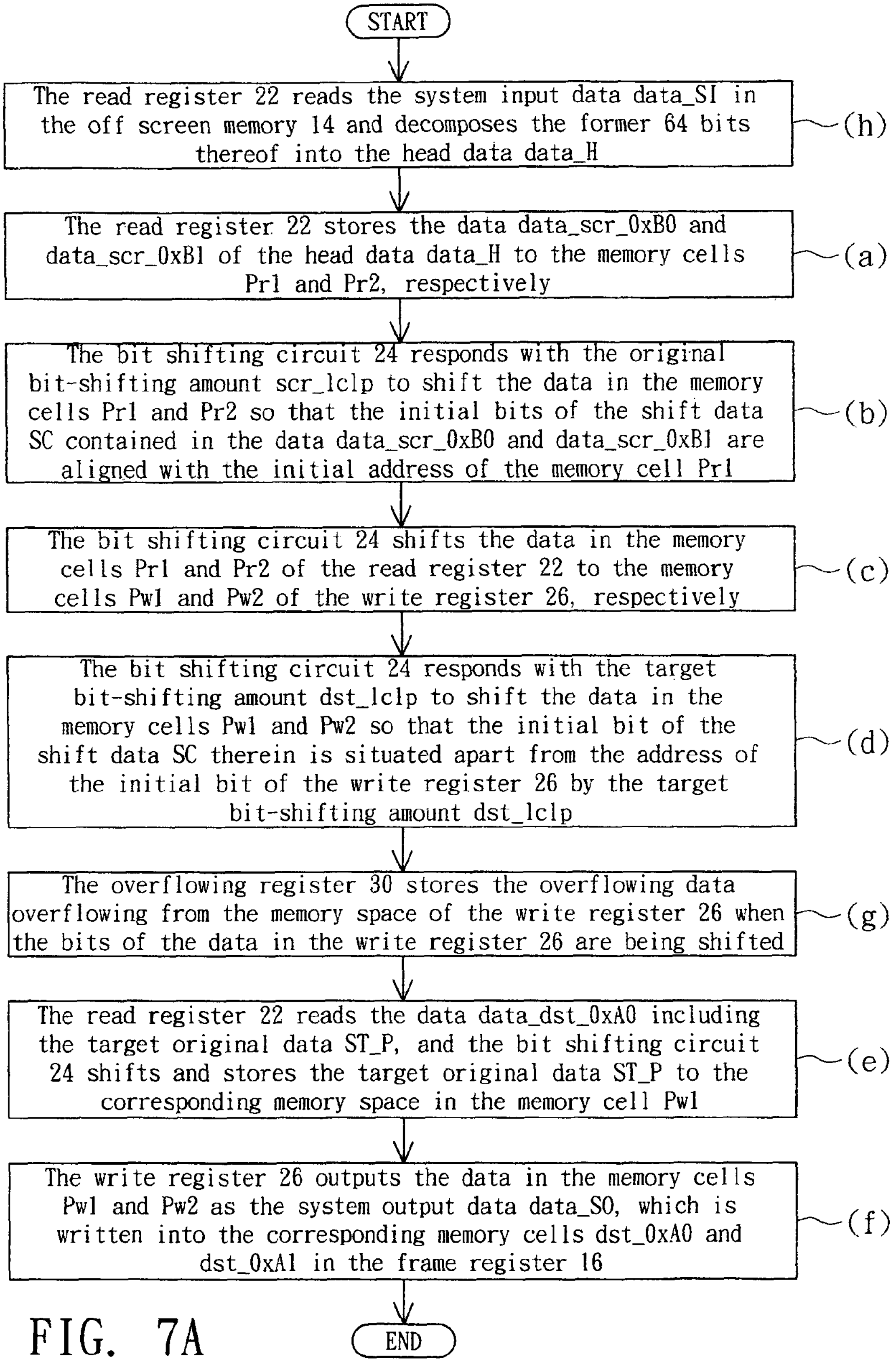
FIG. 7A is a partial flow chart showing a bit block transfer method according to the first embodiment of the invention.

FIG. 7A is a partial flow chart showing a bit block transfer method according to the first embodiment of the invention. First, as shown in step (a), the read register 22 stores the data data_scr__0xB0 and data_scr__0xB1 of the head data data_H to the memory cells Pr1 and Pr2, respectively. Then, as shown in step (b), the bit shifting circuit 24 responds with the original bit-shifting amount scr_lclp to shifts the data in the memory cells Pr1 and Pr2 so that the initial bits of the shift data SC contained in the data data_scr__0xB0 and data_scr__0xB1 are aligned with the initial address of the memory cell Pr1. At this time, the memory cells Pr1 and Pr2 respectively store the data $(88888888)_{16}$ and $(08888888)_{16}$, that is, the former 64 bits of the shift data SC.

Next, as shown in step (c), the bit shifting circuit 24 shifts the data in the memory cells Pr1 and Pr2 of the read register 22 to the memory cells Pw1 and Pw2 in the write register 26, respectively. Then, as shown in step (d), the bit shifting circuit 24 responds with the target bit-shifting amount dst_lclp to shift the data in the memory cells Pw1 and Pw2 so that the initial bit of the shift data SC is situated apart from the address of the initial bit of the write register 26 by the target bit-shifting amount dst_lclp. At this time, the memory cells. Pw1 and Pw2 respectively include the data $(88888880)_{16}$ and $(88888888)_{16}$. In the operation of the step (d), the last fourth to the last second bits $(000)_2$ in the memory cell Pw2 form the overflowing data data_Le, which is stored in the overflowing register 30, for example.

Next, as shown in step (e), the read register 22 reads the data data_dst__0xA0 of the frame register 16 containing the target original data ST_P, and the bit shifting circuit 24 shifts the target original data ST_P and stores the target original data ST_P to the corresponding memory space in the memory cell Pw1. The target original data ST_P is stored in the former dst_lclp bits of the memory space of the memory cell Pw1. At this time, the memory cell Pw1 includes the data $(88888880)_{16}$. Thereafter, as shown in step (f), the write register 26 outputs the data in the memory cells Pw1 and Pw2 as the system output data data_SO, which is written into the corresponding memory cells dst__0xA0 and dst__0xA1 of the frame register 16. Thus, the head data data_H may be shifted to the corresponding address in the frame register 16.

The method further includes, after the step (d), the step (g), in which the overflowing register 30 stores the overflowing data (i.e., the data $(000)_2$) overflowing from the memory space of the write register 26 when the bits of the data in the write register 26 are being shifted. The method further includes, before the step (a), the step (h), in which the read register 22 reads the system input data data_SI in the off screen memory 14, and decomposes the former 64 bits into the head data data_H. Then, the step (a) is performed to shift the head data data_H.

Figure 7B:
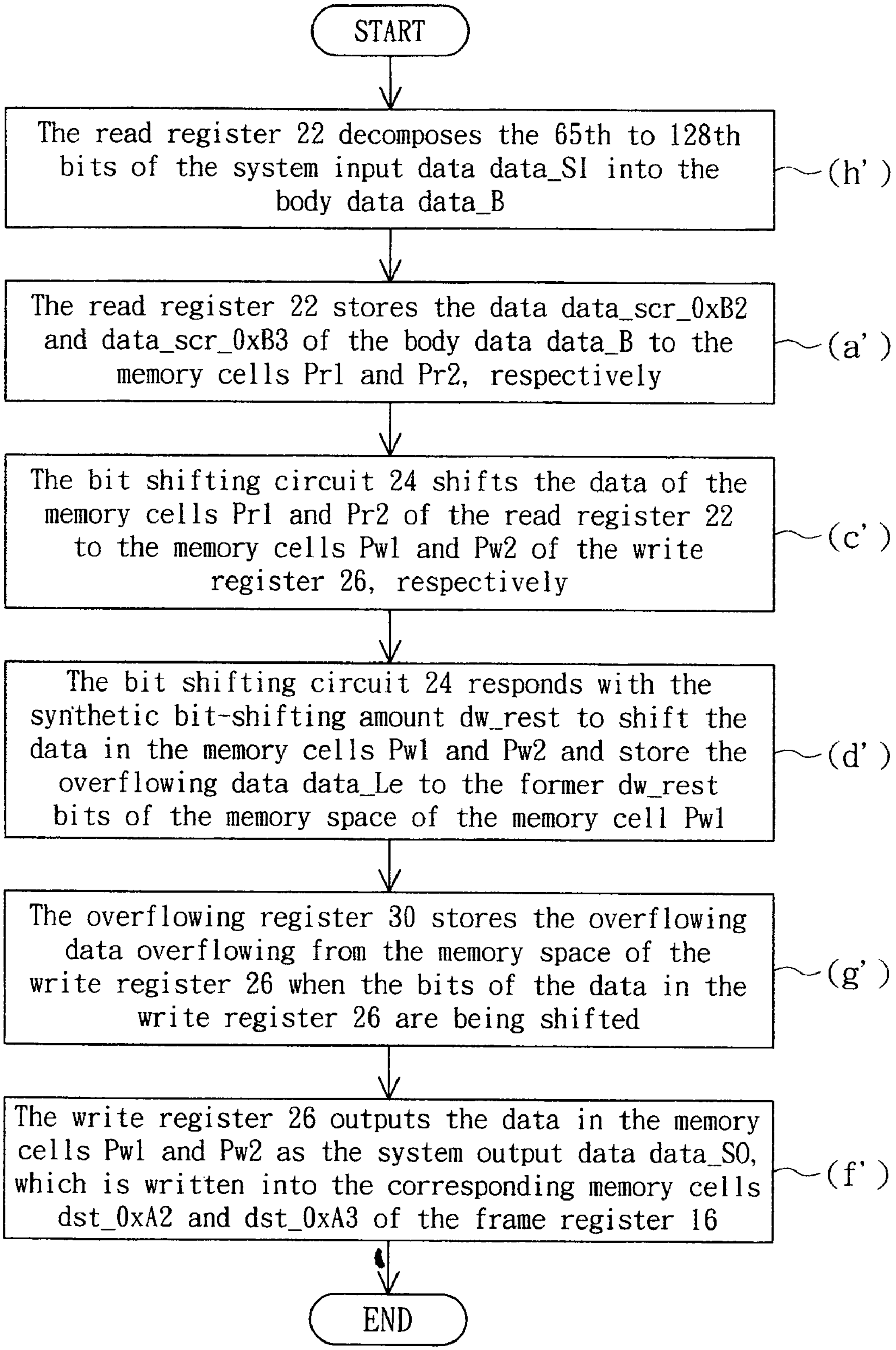
FIG. 7B is a partial flow chart showing the bit block transfer method according to the first embodiment of the invention.

FIG. 7B is a partial flow chart showing the bit block transfer method according to the first embodiment of the invention. As shown in FIG. 7B, the bit block transfer method of this embodiment may execute, after the step (f), the step (h'), in which the read register 22 decomposes the $65^{th}$ to $128^{th}$ bits in the system input data data_SI into the body data data_B. Next, the step (a') is performed, in which the read register 22 reads the data data_scr__0xB2 and data_scr__0xB3 in the body data data_B and respectively stores the data data_scr__0xB2 and data_scr__0xB3 to the memory cells Pr1 and Pr2. Next, the steps (c), (d'), (g') and (f') are sequentially performed. Thus, the bit shifting circuit 24 stores the data in the memory cells Pr1 and Pr2 to the memory cells Pw1 and Pw2, respectively. The bit shifting circuit 24 responds with the synthetic bit-shifting amount dw_rest to shift the data in the memory cells Pw1 and Pw2 and to store the overflowing data data_Le (i.e., the data $(000)_2$) to the former dw_rest bits of the memory space in the memory cell Pw1. At this time, the memory cells Pw1 and Pw2 respectively include data $(11111110)_{16}$ and $(11111111)_{16}$, and the overflowing register 30 stores the overflowing data (i.e., the data $(001)_2$) overflowing from the memory space of the write register 26 when the bits of the data in the write register 26 are being shifted. The write register 26 outputs the data of the memory cells Pw1 and Pw2 as the system output data data_SO, which is written into the corresponding memory cells dst__0xA2 and dst__0xA3 of the frame register 16. Thus, the body data data_B can be shifted to the corresponding address in the frame register 16.

Figure 7C:
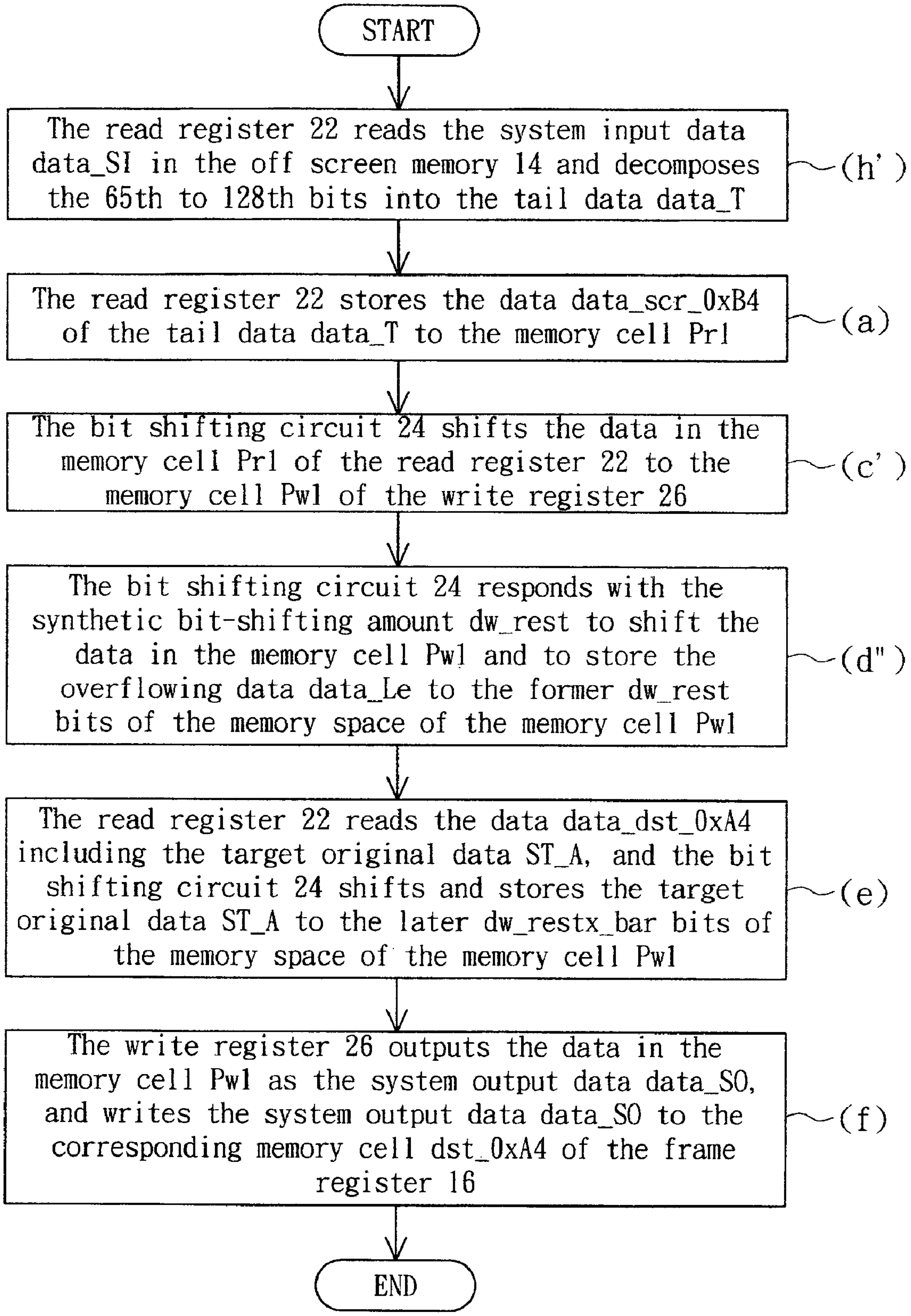
FIG. 7C is a partial flow chart showing the bit block transfer method according to the first embodiment of the invention.

FIG. 7C is a partial flow chart showing the bit block transfer method according to the first embodiment of the invention. The bit block transfer method of this embodiment may execute, after the step (f'), the step (h"), in which the read register 22 decomposes the later 32 bits in the system input data data_SI into the tail data data_T. Next, the step (a") is performed to read the data data_scr__0xB4 of the tail data data_T and store the data data_scr__0xB4 to the memory cell Pr1. Then, the steps (c"), (d"), (e") and (f") are sequentially performed. Thus, the bit shifting circuit 24 stores the data in the memory cell Pr1 to the memory cell Pw1. The bit shifting circuit 24 responds with the synthetic bit-shifting amount dw_rest to shift the data in the memory cell Pw1 and to store the overflowing data data_Le to the former dw_rest bits of the memory space in the memory cell Pw1. At this time, the memory cell Pw1 includes the data $(A0B0C0D1)_2$, and the read register 22 reads the data data_dst__0xA4 of the frame register 16 containing the target original data ST_A, and stores the target original data ST_A to the later dw_restx_bar bits of the memory cell Pw1. At this time, the memory cell Pw1 includes the data $(0F0F0F0)_{16}$, and the write register 26 outputs the data in the memory cell Pw1 as the system output data data_SO, which is written into the corresponding memory cell dst__0xA4 of the frame register 16. Consequently, the tail data data_T can be shifted to the corresponding address in the frame register 16.

In this embodiment, only the condition, in which the shift data SC is divided into the head, body and tail data data_H, data_B and data_T, is illustrated. However, the shift data SC may incompletely include the head, body and tail data when the original address, the target address and the data quantity of the shift data SC are changed. However, the shift data SC may be shifted according to the operations similar to those mentioned hereinabove, no matter which kind of data is included therein. For example, the shift data is the data corresponding to the $2^{nd}$ to $20^{th}$ bits of data in the memory cell scr__0xB0. At this time, the shift data may be regarded as the head and tail data simultaneously, and the shift data may be shifted according to the steps substantially similar to those for shifting the head data and the target merging operation of the tail data.

In this illustrated embodiment, the bit shifting circuit 24 only includes the switches SW1 to SW3, the input registers IB1 and IB2 and the output register OB and thus simultaneously responds with the original bit-shifting amount scr_lclp to shift the stored position of the data in the read register 22, and responds With the target bit-shifting amount dst_lclp to shift the stored position of the data in the write register 26 and to shift the target original data ST_P and ST_A to the corresponding stored addresses in the write register 26. However, the circuit architecture of the bit shifting circuit 24 is not limited to the circuit structure mentioned in this embodiment, and may be somewhat modified.

In this embodiment, illustrations are made with reference to the condition, in which the to-be-shifted shift data SC crosses two memory cells scr__0xB0 and scr__0xB1, that is, the data to be stored in the read register 22 includes 64 bits, and the data quantity thereof is equal to the total memory space (2×32) of the read and write registers 22 and 26. However, the method of the bit block transfer circuit 20 according to this embodiment can shift the data, which is not restricted to that crossing the two memory cells, and the length of the data that has to be stored in the read register 22 during the data shifting operation is not restricted to that equal to the total memory space of the read and write registers 22 and 26.

In this embodiment, illustrations of the bit block transfer circuit 20 are made with reference to the illustrative operation, in which the shift data SC in the off screen memory 14 is shifted to the frame register 16. However, the bit block transfer circuit 20 of this embodiment is not restricted to the operation of shifting the data in the off screen memory 14 to the frame register 16, and may be widely applied to any application occasion, in which the memory data access is required.

One bit may serve as the minimum data quantity unit that may be operated in the bit block transfer circuit and the method thereof according to this embodiment. Thus, compared with the conventional memory block transfer technology, the bit block transfer circuit and the method thereof according to this embodiment have the advantages of reducing the memory transfer bandwidth to be occupied, of enhancing the display effect of the display system and of being flexibly applied to the low-level OSD circuit having the data quantity of each pixel data, which is smaller than one byte.

Second Embodiment

The bit block transfer circuit 20 of this embodiment receives the system input data data_SI, and outputs the corresponding display data data_DP as the system output data data_SO to the target address in the frame register 16. Thus, the color filling operation can be performed in the corresponding display region of the display panel 18 according to the display data data_DP. The operation of the bit block transfer circuit 20 in this embodiment differs from that in the first embodiment in that the operation of reading the data that is not aligned with a memory cell edge and the operation of shifting the data thereof to obtain the data aligned with the memory cell edge need not to be performed, and the display data can be directly written into the target address in the frame register 16.

For example, the display data data_DP includes 19 bits, and the data stored at the address scr_ba={0xA0,00000} to {0xA0, 10010} is equal to $(0001101100011011000)_2$. The target address of this embodiment includes the address dst_ba={0xB0,00001} to {0xB0,10011}, for example. The bit block transfer circuit 20 of this embodiment and the bit block transfer circuit of the first embodiment have substantially similar circuit structures and operations. However, the difference therebetween is that the state machine chart executed by the processor 28 does not have the source shifting state SR_SHIFT at this time, and the read-write transferring state CALC is directly executed after the source reading state SR.

Figure 8:
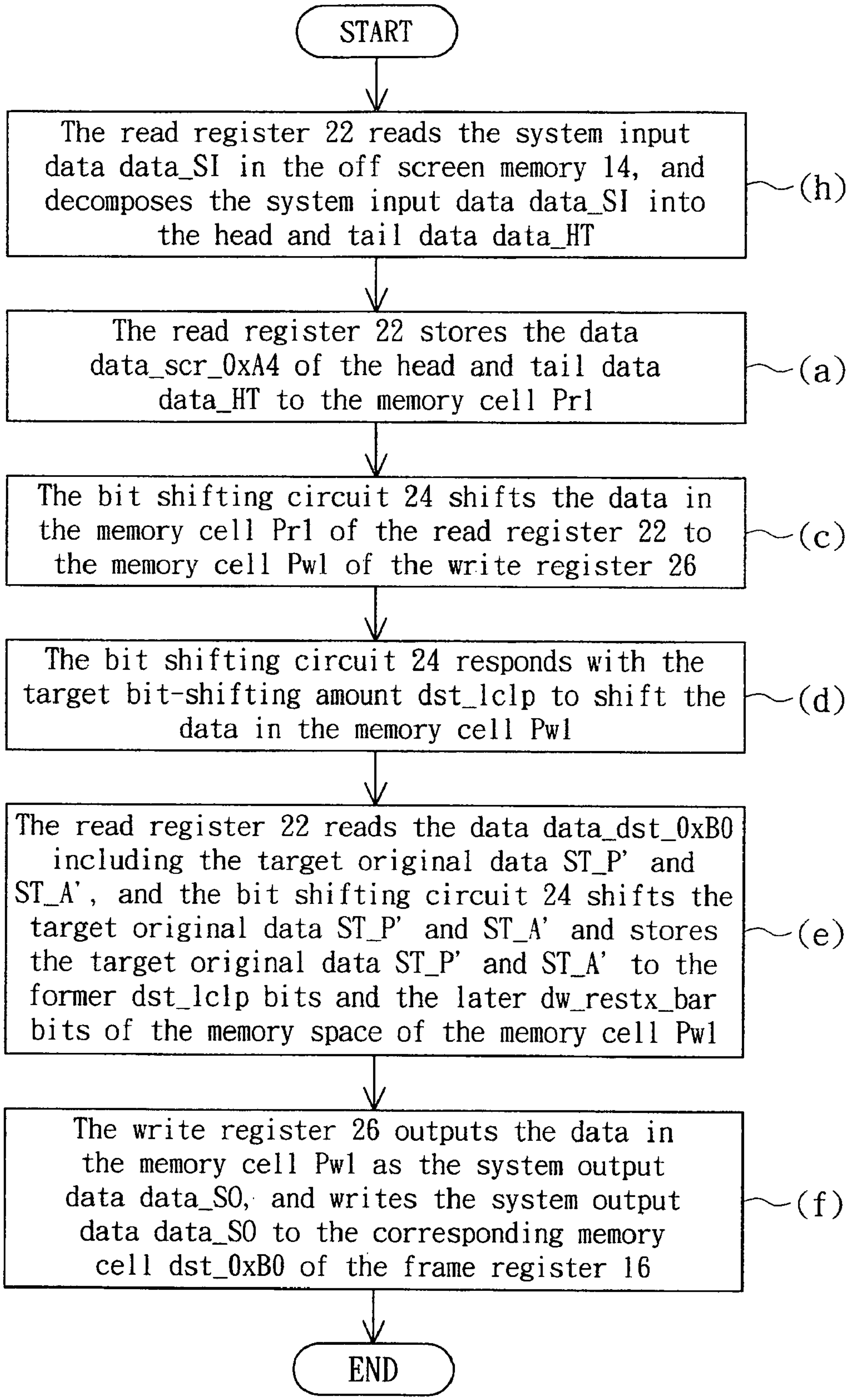
FIG. 8 is a flow chart showing a color filling method according to a second embodiment of the invention.

The flow chart corresponding to the color filling method is shown in FIG. 8. The bit number of the display data data_DP is smaller than the bits of the memory space of one memory cell and each bit falls within the memory cell scr__0x0A. Thus, the color filling method of this embodiment does not have the step (b) of the bit block transfer method of the first embodiment. In addition, the differences between the methods of the second and first embodiment include the following features. The head and tail data data_HT are obtained in the step (h), no step (g) follows the step (d), and the target original data ST_P' and ST_A' are respectively written into the former dst_lclp bits and the later dw_restx_bar bits of the memory space of the memory cell Pw1 in the step (e).

Thus, the bit block transfer circuit 20 of this embodiment can effectively write the display data data_DP into the target address. Consequently, compared with the conventional memory block transfer technology, the bit block transfer circuit and the method thereof according to this embodiment have the advantages of reducing the memory transfer bandwidth to be occupied, of enhancing the display effect of the display system and of being applied to the low-level OSD device having the data quantity of each pixel data, which is smaller than one byte.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bit block transfer (Bitblt) circuit, comprising:

a read register for storing decomposition data comprising original data;

a write register;

a bit shifting circuit for shifting the decomposition data in the read register to the write register and shifting bits of the decomposition data in the write register so that an initial bit of the original data of the decomposition data is situated apart from an initial address of the write register by a bit-shifting amount; and an overflowing register, coupled to the write register, for storing overflowing data of the original data overflowing from a memory space of the write register when the bits of the decomposition data in the write register are being shifted, wherein the write register outputs and writes the decomposition data stored in the write register to a memory cell of a first memory; wherein the read register and the write register respectively comprise a plurality of first memory cells and a plurality of second memory cells, and the bit block transfer circuit comprises:

a first multiplexer (Mux) for responding with a first select signal to output stored data stored in one of the first memory cells;

a second multiplexer for responding with a second select signal to output stored data stored in one of the second memory cells;

a third multiplexer for responding with a first level and a second level of a third control signal to respectively output the data, outputted from the first and second multiplexers, to the bit shifting circuit;

a first de-multiplexer for responding with a first level and a second level of a fourth control signal to respectively provide the data, generated by the bit shifting circuit, to the read register and the write register;

a second de-multiplexer for responding with a fifth control signal to select and store the data, generated by the bit shifting circuit, to one of the first memory cells; and a third de-multiplexer for responding with a sixth control signal to select and store the data, generated by the bit shifting circuit, to one of the second memory cells.

2. The bit block transfer circuit according to claim 1, wherein the bit shifting circuit further stores the overflowing data to the former N bits of the memory space of the write register when processing next piece of decomposition data.

3. The bit block transfer circuit according to claim 1, wherein the bit shifting circuit comprises:

a first input register and a second input register;

a first switch unit for responding with a first level and a second level of a seventh select signal to respectively provide the data, outputted from the third multiplexer, to one of the first and second input registers;

a second switch unit and a third switch unit for respectively responding with an eighth select signal and a ninth select signal to select and output a portion of the decomposition data of the first and second input registers; and an output register for storing a portion of the decomposition data, outputted from the second and third switch units, and thus generating and outputting output data.

4. The bit block transfer circuit according to claim 3, further comprising:

a processor for providing the first to ninth select signals and executing a state machine to drive the read register, the write register and the bit block transfer circuit to operate.

5. The bit block transfer circuit according to claim 1, wherein:

the read register reads system input data in a second memory, and decomposes the system input data into a plurality of pieces of division data comprising first division data, which is head data, and last division data, which is tail data; and the read register sequentially adopts the pieces of division data as the decomposition data and stores the decomposition data.

6. A bit block transfer (Bitblt) method, comprising the steps of:

(a) storing decomposition data to a read register, the decomposition data comprising original data;

(b) responding with an original bit-shifting amount to shift bits of the decomposition data so that an initial bit of the original data is aligned with an initial address of the read register;

(c) storing the decomposition data to a write register;

(d) shifting the bits of the decomposition data in the write register so that the initial bit of the original data of the decomposition data is situated apart from an initial bit of the write register by a target bit-shifting amount;

(e) reading first target original data and storing the first target original data to the former target bit-shifting amount of addresses in the write register, wherein the first target original data is stored to the former target bit-shifting amount of bit addresses of a memory cell in a first memory;

(f) storing the decomposition data in the write register to the memory cell;

wherein the method further comprises reading system input data in a second memory and decomposing the system input data into a plurality of pieces of division data comprising first division data, which is head data, and last division data, which is tail data, the pieces of division data sequentially serve as the decomposition data stored in the read register; and corresponding data processing is performed through steps (a) to (f) when the decomposition data is equal to the head data;

wherein when the decomposition data is equal to the tail data, the method further comprises the steps of:

(c) storing the decomposition data to the write register;

(d') shifting the bits of the decomposition data in the write register so that the initial bit of the original data of the decomposition data is situated apart from the initial bit of the write register by a synthetic bit-shifting amount, wherein the synthetic bit-shifting amount is equal to a difference between the original bit-shifting amount and the target bit-shifting amount;

(e') reading second target original data and storing the second target original data to later K bit addresses in the write register, wherein the second target original data is data stored in the later K bit addresses of the memory cell; and (f) storing the decomposition data in the write register to the memory cell.

7. The method according to claim 6, further comprising the step of:

(g) storing overflowing data of the decomposition data overflowing from a memory space of the write register when the bits of the decomposition data in the write register are being shifted.

8. The method according to claim 6, wherein K satisfies the equation:

$$K=BN\_SC-[dst\_lclp+(BN\_SC \bmod BN\_RB)],$$

wherein BN_RB denotes a memory capacity of the read register, BN_SC denotes a bit number of the original data, and dst_lclp is the target bit-shifting amount, and mod is a modulo command.

9. The method according to claim 6, wherein the step (d') further comprises:

(d1) storing overflowing data to former N bits of the memory space in the write register, wherein N is equal to the synthetic bit-shifting amount.

10. The method according to claim 6, wherein at least one piece of division data ranging from the head data and the tail data in the pieces of division data is body data.

11. The method according to claim 10, further comprising, when the decomposition data is the body data, the steps of:

(c) storing the decomposition data to the write register;

(d') shifting the bits of the decomposition data in the write register so that the initial bit of the original data of the decomposition data is situated apart from the initial bit of the write register by a synthetic bit-shifting amount, wherein the synthetic bit-shifting amount is equal to a difference between the original bit-shifting amount and the target bit-shifting amount; and (f) storing the decomposition data in the write register to the first memory.

12. The method according to claim 11, wherein the step (d') further comprises:

(d1') storing overflowing data to the former synthetic bit-shifting amount of bits of the memory space in the write register.

13. The method according to claim 11, further comprising the step of:

(g) storing overflowing data of the decomposition data overflowing from the memory space of the write register when the bits of the decomposition data in the write register are being shifted.

* * * * *